United States Patent
Kim

(10) Patent No.: US 7,740,293 B2
(45) Date of Patent: Jun. 22, 2010

(54) COMBINATION BUMPER COVER AND STIFFENER FOR VEHICLES

(75) Inventor: Tak Su Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/276,239

(22) Filed: Nov. 21, 2008

(65) Prior Publication Data

US 2009/0152882 A1   Jun. 18, 2009

(30) Foreign Application Priority Data

Dec. 18, 2007   (KR) .................... 10-2007-0132969

(51) Int. Cl.
*B60R 19/48* (2006.01)
(52) U.S. Cl. .............. 293/132; 296/187.03; 296/187.04
(58) Field of Classification Search ................. 293/120, 293/121, 122, 117, 132; 296/187.03, 187.04
See application file for complete search history.

(56) References Cited

U.S. PATENT DOCUMENTS

| | | | | |
|---|---|---|---|---|
| 4,385,779 | A * | 5/1983 | Kimura et al. | 293/102 |
| 6,447,049 | B1 * | 9/2002 | Tohda et al. | 296/180.1 |
| 6,634,702 | B1 * | 10/2003 | Pleschke et al. | 296/187.04 |
| 7,210,732 | B2 * | 5/2007 | Marijnissen et al. | 296/198 |
| 7,578,547 | B1 * | 8/2009 | Mackay et al. | 296/191 |
| 2003/0020290 | A1 * | 1/2003 | Cherry | 293/120 |
| 2009/0160203 | A1 * | 6/2009 | Garg et al. | 293/120 |

* cited by examiner

*Primary Examiner*—Glenn Dayoan
*Assistant Examiner*—Pinel E Romain
(74) *Attorney, Agent, or Firm*—Morgan, Lewis & Bockius LLP

(57) ABSTRACT

A combination bumper cover and stiffener for vehicles maintains a good appearance and maximizes the absorption of shocks when a pedestrian is hit by the front of a vehicle. The combination bumper cover and stiffener includes a stiffener and a bumper cover. The stiffener includes a first mounting surface which contacts a front end module carrier of a vehicle, an extension surface which extends from the first mounting surface towards a front of the vehicle, and a second mounting surface which is formed by bending an edge of the extension surface towards a rear of the vehicle. The bumper cover is mounted at one surface thereof to the second mounting surface.

6 Claims, 3 Drawing Sheets

COMBINATION BUMPER COVER AND STIFFENER FOR VEHICLES

CROSS-REFERENCE TO RELATED APPLICATION

The present application claims priority to Korean Application No. 10-2007-0132969 filed Dec. 18, 2007, the entire contents of which application is incorporated herein for all purposes by this reference.

BACKGROUND OF THE INVENTION

1. Field of the Invention

The present invention relates generally to a stiffener for vehicles that insures the safety of a pedestrian when the pedestrian is hit by a vehicle and, more particularly, to a combination bumper cover and stiffener for vehicles that is constructed so that one surface of a stiffener is united with a bumper cover of a vehicle to provide more efficient shock absorption in the event that a pedestrian is hit by a vehicle.

2. Description of Related Art

Generally, as shown in FIG. 1, a bumper cover 30 is mounted to a front end module carrier 10 of a vehicle, and provides a pleasing appearance when the hood 40 of the vehicle is opened, and absorbs shock in the case of a head-on collision.

Further, a stiffener 20 is mounted to the lower portion of the front end module carrier 10 to meet a legform test for a pedestrian. When a pedestrian is hit by the vehicle, the stiffener 20 absorbs shocks, and causes the pedestrian to land on the hood 40, thus minimizing shocks due to the collision.

However, the conventional stiffener 20 and bumper cover 30 for vehicles have separate functions, so that the stiffener 20 and the bumper cover 30 are separately installed at predetermined positions. Thus, when a pedestrian is hit by the vehicle, the pedestrian is bumped against the bumper cover 30 and thus is primarily subjected to shocks. After that, the stiffener 20 absorbs shocks. Therefore, the effect of the stiffener 20, which is installed to absorb shocks in the event of a collision, is decreased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention have been developed to overcome the above problems. Various aspects of the present invention provide for a combination bumper cover and stiffener for vehicles, in which a stiffener is integrated with a bumper cover, thus having improved shock-absorbing ability.

One aspect of the present invention is directed to a combination bumper cover and stiffener for vehicles including a stiffener and a bumper cover. The stiffener may include a first mounting surface contacting a front end module carrier of a vehicle, an extension surface extending from the first mounting surface towards a front of the vehicle, and/or a second mounting surface extending from a forward edge of the extension surface towards a rear of the vehicle. The bumper cover may be mounted to the second mounting surface.

The extension surface may include a shock absorbing member. The shock absorbing member may be formed by inclining the extension surface of the stiffener upwards at a predetermined angle towards the front of the vehicle.

The shock absorbing member may include a hole formed in the extension surface. The hole may be elongated and may extend in a longitudinal direction of the vehicle. The combination may include a plurality of holes elongated in a longitudinal direction of the vehicle.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
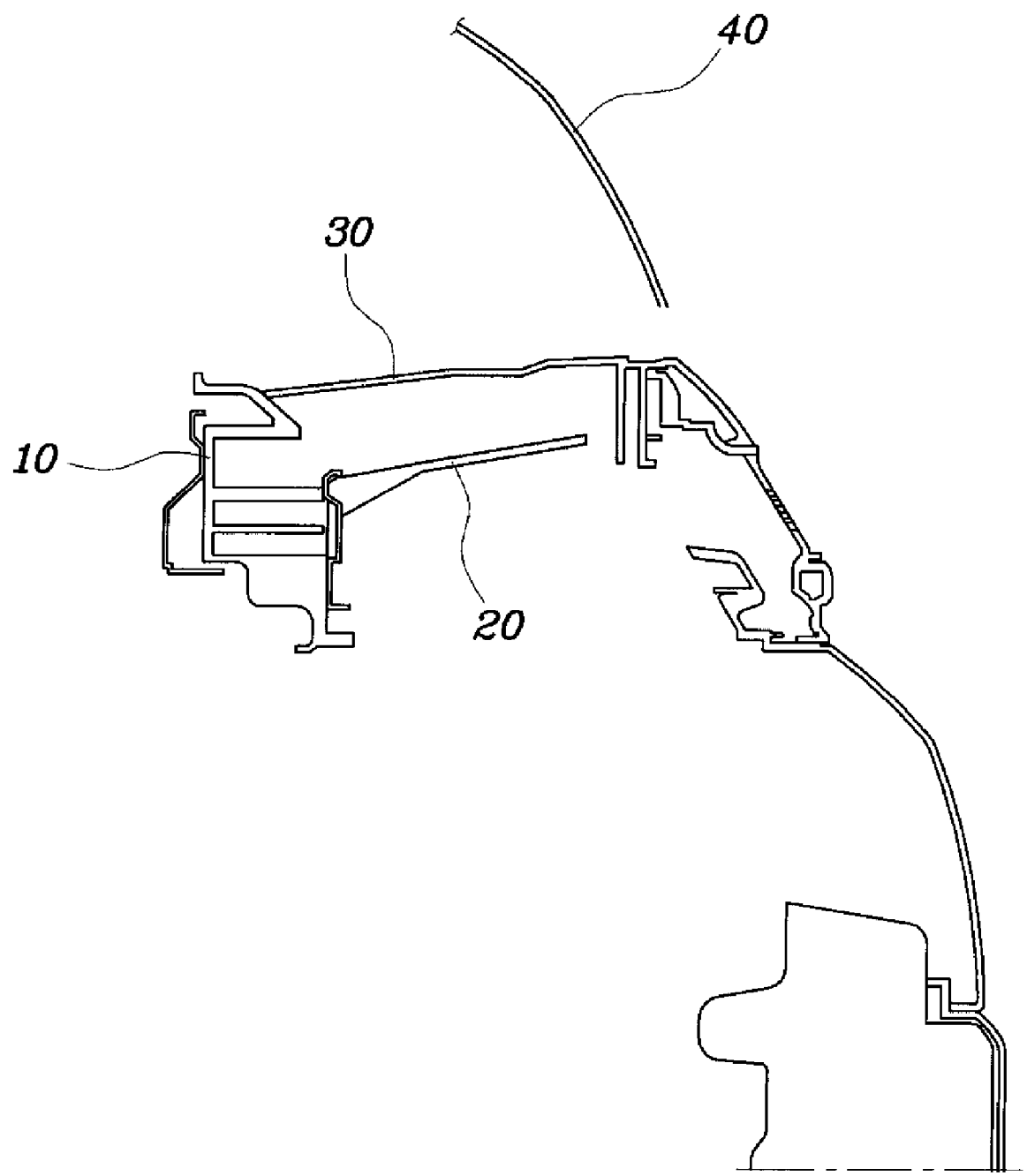
FIG. 1 is a schematic sectional view showing a conventional stiffener mounted to a front end module carrier.
Figure 2:
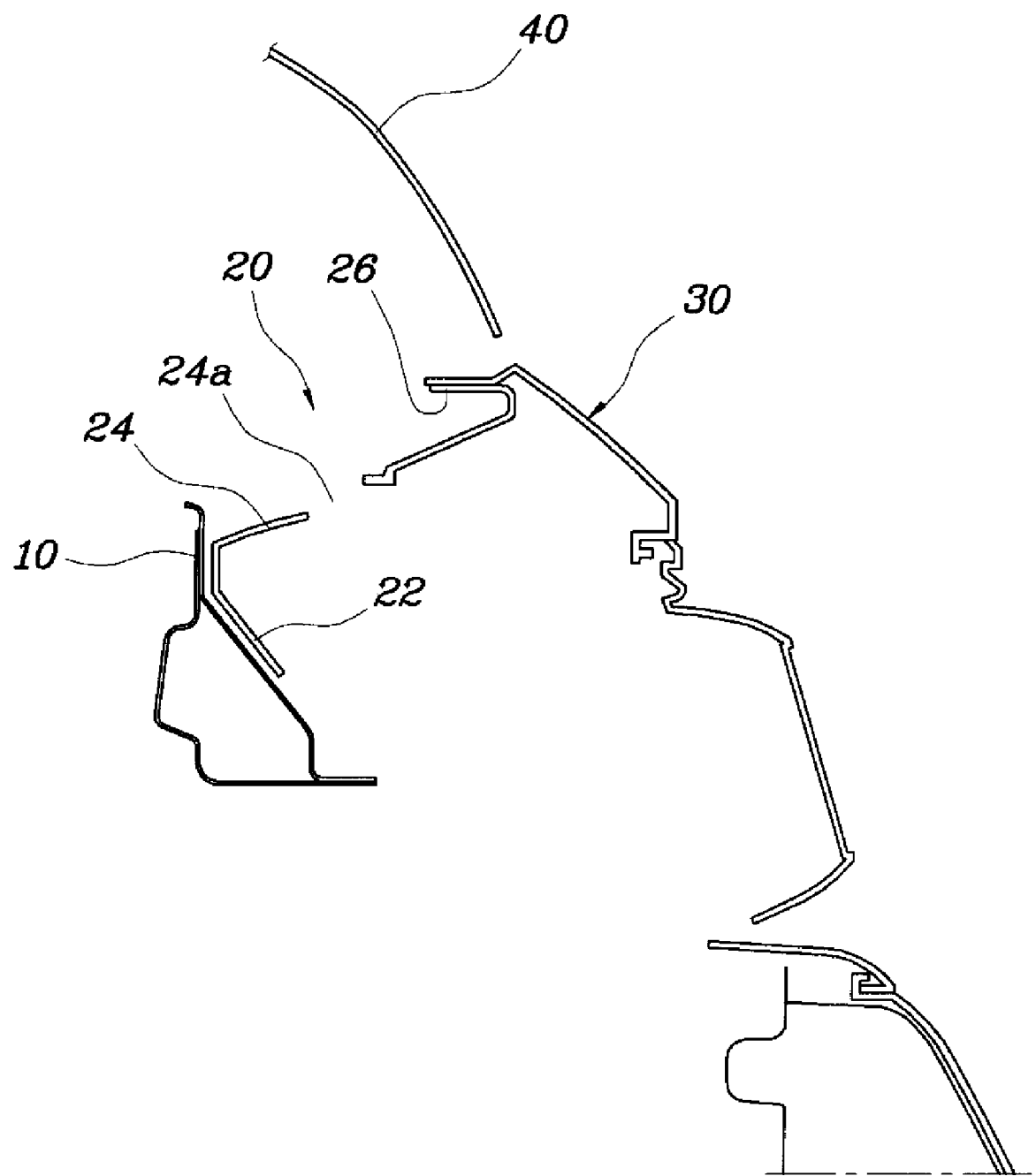
FIG. 2 is a schematic sectional view showing an exemplary combination bumper cover and stiffener for vehicles mounted to a front end module carrier according to the present invention.

As shown in FIG. 2, a stiffener 20 of the combination bumper cover and stiffener includes a first mounting surface 22, which is placed adjacent to a front end module carrier 10 and is mounted thereto.

An extension surface 24 extends from one edge of the first mounting surface 22 towards the front of a vehicle. The extension surface 24 is made of a material which is easily deformable and thus absorbs shocks when a pedestrian is hit by the vehicle.

The extension surface 24 is bent at the other edge thereof toward the rear of the vehicle, thus providing a second mounting surface 26.

Preferably, the extension surface 24 of the stiffener 20 is inclined upwards at a predetermined angle towards the front of the vehicle. As shown in FIG. 2, the extension surface 24 and the bumper cover 30 form an obtuse angle. Since the extension surface 24 is inclined upwards at a predetermined angle with respect to a horizontal plane, lateral force applied to a pedestrian that is hit by the vehicle can be minimized. Further, when a pedestrian is hit by the vehicle, the inclined extension surface 24 allows the pedestrian to easily land on the hood 40 of the vehicle, thus protecting the pedestrian from serious injury.

Figure 3:
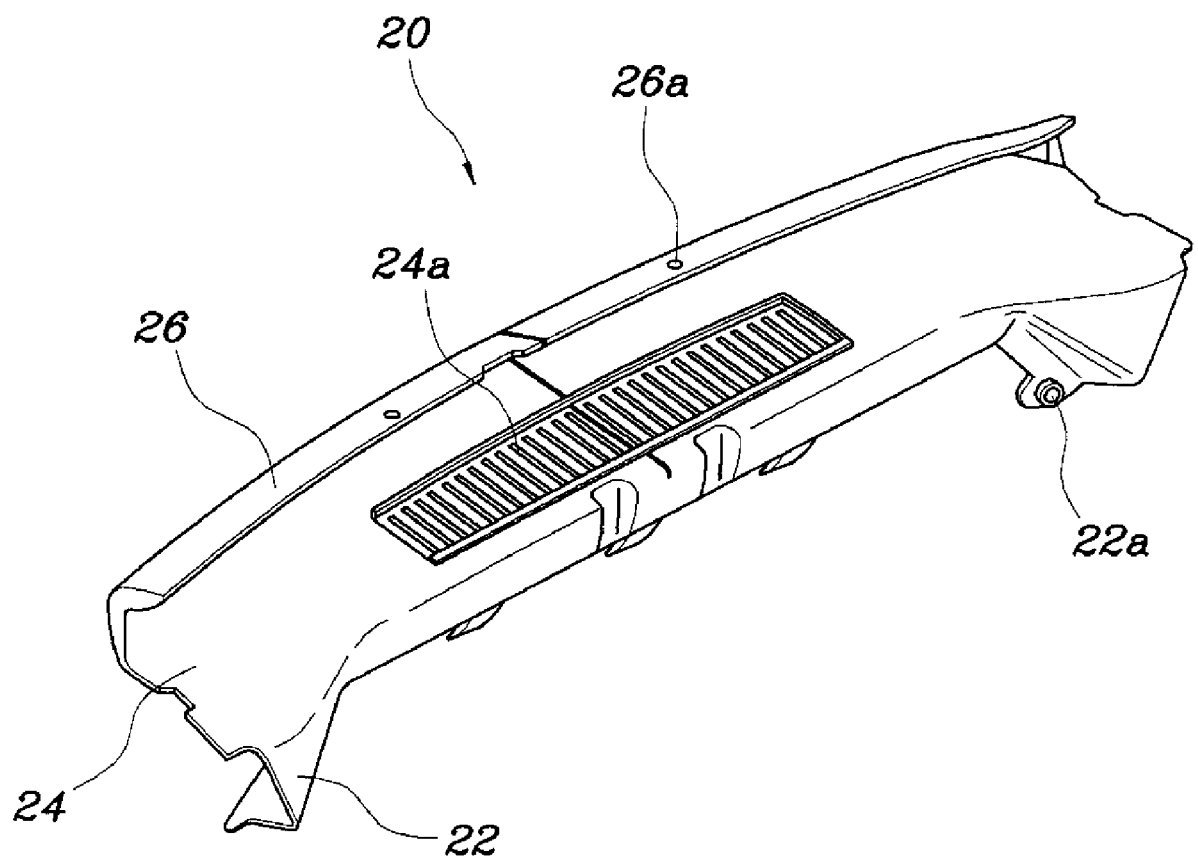
FIG. 3 is a perspective view showing an exemplary stiffener of the combination bumper cover and stiffener for vehicles according to the present invention.

As shown in FIG. 3, the stiffener 20 is made of a material which is easily deformable, preferably a polypropylene (PP)

material. A shock absorbing member 24a is provided on the extension surface 24 of the stiffener 20 to more efficiently absorb shocks.

The shock absorbing member 24a may comprise a plurality of holes which extend a long distance in the longitudinal direction of the vehicle. If each hole extends a long distance in the width direction of the vehicle, the stiffener 20 is plastically deformed before it completely absorbs shocks when a pedestrian is hit by the vehicle. Thus, holes that extend a long distance in the width direction of the vehicle cannot efficiently perform a shock absorbing function. That is, when a pedestrian is hit by the vehicle, the stiffener 20 is deformed in a very short period of time, so that the amount of shock that is absorbed is very small. Therefore, in order to maximize the absorption of shocks, it is preferable that each of the holes extend a long distance in the longitudinal direction of the vehicle. This construction allows the stiffener 20 to be elastically or plastically deformed after a predetermined period of time, when a pedestrian is hit by the front of the vehicle. When the plurality of holes is formed at regular intervals, the shock absorbing ability is further improved.

Mounting holes 22a are formed in the first mounting surface 22. Since the plurality of mounting holes 22a is formed at regular intervals, the first mounting surface 22 is more firmly mounted to the front end module carrier 10 via bolts.

Further, a plurality of mounting holes 26a is formed in the second mounting surface 26 at regular intervals. Thus, the second mounting surface 26 is more firmly mounted to the bumper cover 30 via retainers.

As described above, the present invention provides a combination bumper cover and stiffener for vehicles, which maintains a good appearance when a hood is opened, and insures the safety of pedestrians, in addition to more efficiently absorbing shocks.

For convenience in explanation and accurate definition in the appended claims, the terms "lower", "front", "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A combination bumper cover and stiffener for vehicles, comprising:
    a stiffener including:
        a first mounting surface contacting a front end module carrier of a vehicle;
        an extension surface extending from the first mounting surface towards a front of the vehicle; and
        a second mounting surface extending from a forward edge of the extension surface towards a rear of the vehicle; and
    a bumper cover mounted to the second mounting surface;
    wherein the extension surface is inclined upwards at a predetermined angle towards the front of the vehicle and includes a shock absorbing member.

2. The combination bumper cover and stiffener as set forth in claim 1, wherein the shock absorbing member comprises a hole formed in the extension surface.

3. The combination bumper cover and stiffener as set forth in claim 2, wherein the hole is elongated and extends in a longitudinal direction of the vehicle.

4. The combination bumper cover and stiffener as set forth in claim 3, further comprising a plurality of holes elongated in a longitudinal direction of the vehicle.

5. The combination bumper cover and stiffener as set forth in claim 1, wherein the extension surface is covered by a hood of the vehicle.

6. A combination bumper cover and stiffener for vehicles, comprising:
    a stiffener including:
        a first mounting surface contacting a front end module carrier of a vehicle;
        an extension surface extending from the first mounting surface towards a front of the vehicle; and
        a second mounting surface extending from a forward edge of the extension surface towards a rear of the vehicle; and
    a bumper cover mounted to the second mounting surface,
    wherein the extension surface is inclined upwards at a predetermined angle towards the front of the vehicle and includes a shock absorbing member, and
    wherein the extension surface and the bumper cover form an obtuse angle.

* * * * *